Patented May 6, 1952

2,595,954

UNITED STATES PATENT OFFICE 2,595,954

POLYVINYL ACETATE EMULSION CONTAINING AN ALIPHATIC CARBOXYLIC ACID, AND BASE COATED THEREWITH

Walter G. Kunze and Raymond Bertram Evans, Catonsville, Md., assignors to Le Page's Inc., Gloucester, Mass., a corporation of Massachusetts No Drawing. Application April 6, 1950, Serial No. 154,425

9 Claims. (Cl. 260—29.6)

This invention relates to emulsions of polymers which are suitable for use as coatings and as adhesives. It is particularly concerned with such an emulsion of polymers which is capable of providing a water-resistant bond or coating and which at the same time retains the stability, fluidity and the various other physical properties of such an emulsion which make it particularly useful as a coating or adhesive.

The use of melts and solutions of water insoluble artificial resins in the coating and adhesive art has been supplanted to a large extent by emulsions of such resins, particularly polyvinyl acetate emulsions, due to the improved ease, economy and safety with which aqueous emulsions of the resin may be employed. On the other hand, the usefulness of water insoluble polymer emulsions has been limited by the characteristic lack of water-resistance of the coatings and bonds deposited therefrom at room temperatures and the tendency of such coatings and bonds to re-emulsify or disintegrate when subsequently brought into contact with water during the course of normal use of the object or article to which they have been applied.

This lack of water-resistance has been considered innate in the coatings and films deposited from such polymer emulsions inasmuch as water-soluble emulsifying and bodying agents are employed necessarily to establish and stabilize the emulsion. These agents are apparently carried into the film or bond deposited from the emulsion upon application of the emulsion to a surface, and actively exhibit the emulsifying effect on the polymer comprising the body of the coating or film and cause its redispersion when the surface is brought into contact with water.

Various proposals have been made to obviate the water-sensitivity of the coatings or bonds deposited from such emulsions, but in general these proposals have been directed to modifying emulsions of such polymers which have been prepared in a specific manner, or require treating the emulsion with certain diluents immediately prior to its application due to the recognized tendency of the suggested diluents to either break or gel the emulsion shortly after the addition of the diluent.

Prior to the instant invention, for example, a common expedient for increasing the water-resistance of a coating or film deposited from a water-insoluble polymer emulsion included the addition of a quantity of one or more substances such as dimethylol urea, trimethylol melamine, certain chromium salts, strong acids or highly reactive aldehydes such as glyoxal, certain resins, toluene and peroxides. In most instances it was required that the substances be added to the polymer emulsion immediately prior to use as the resulting compositions were unstable and certain of the substances resulted in a progressive increase in the viscosity of the emulsion until a gel was formed. Gelling rendered the composition unfit for use in adhesive applicator machines operated at high speed. Additionally, the modification effected by some of these substances did not result in a substantial improvement in the water-resistance of the coating or film deposited from the emulsion, and often imparted undesirable color and foaming characteristics to the emulsion.

Where thermo-plastic polymeric material has been employed, it has been suggested that the water-resistance of the coating or bond deposited from an emulsion of the material can be improved by heating the coating or bond sufficiently to cause coalescence of the material into a homogeneous mass. This procedure is obviously not suitable where the emulsion is employed as a quick-setting adhesive in high-speed mechanical applicators, and in any event the drying and heating suggested often makes the use of such emulsions economically prohibitive.

A further suggestion directed to retaining the advantages of working with the polymers in an aqueous medium and at the same time avoiding the inherent disadvantages of water-sensitivity of the coatings or films deposited therefrom required dispersing the polymer as extremely small particles. The coatings or films deposited from such emulsions do exhibit a satisfactory water-resistance, but due to the fine particle size which imparts the water-resistance, the emulsions do not have the tack necessary to make them useful as quick-setting adhesives.

It is an object of this invention to provide a composition comprising an aqueous emulsion of a polymer, particularly a polymer of vinyl acetate, alone or in combination with small quantities of other monomers, which is stable throughout long periods of storage, and which when employed as a coating or as an adhesive will deposit a coating or bond which is highly water-resistant. A further object of the invention is to provide a process which is generally applicable to modify emulsions of polymers, particularly polyvinyl acetate, which have been polymerized to different extents, or in different manners, and which include various combinations of plasticizers and other diluents commonly employed to develop favored characteristics in the films or coatings deposited from such emulsions.

We have discovered that the water-resistance of coatings or bonds deposited from an aqueous emulsion of polymers, particularly polyvinyl acetate emulsions, which are formulated, or modified, to have a tackiness rendering them suitable for use as quick-setting adhesives, can be established by additions of one or more of a certain group of organic compounds within specific limits. These active compounds are characterized by a particular balance between the parts of the monomeric molecule, one part of which is hydrophilic or polar in nature, and the other part of which is hydrophobic or non-polar. The effectiveness of the compounds in producing water-resistance in the coatings or bonds deposited from such emulsions is apparently due to the presence of both the polar and non-polar groups within the molecule in the prescribed balance.

Many of these active compounds exhibit solubility, to various extents, in both water and in organic solvents such as mineral spirits, petroleum ether, toluene, castor oil, etc. This solubility in both water and organic solvents apparently is due to the dual hydrophilic-hydrophobic nature of the compound. As it has been generally recognized that the presence of water-soluble emulsifiers carried into the bonds and coatings deposited from emulsions of water-insoluble polymers may later cause redispersion and disintegration of the bonds and coatings, it was particularly surprising to find that incorporating into the emulsion additional compounds which are water-soluble themselves will nullify the effect of the water-soluble emulsifiers and thereby impart water-resistance to the coatings and films deposited from such emulsions.

For present purposes a polar or hydrophilic group or radical may be considered to be one which has a strong affinity for water and which when combined in compounds in which it is the dominant functional group will cause the resulting compound to be immiscible, or miscible to a limited extent, in oil-type solvents. A non-polar or hydrophobic group, on the other hand, may be considered to be one which has slight affinity for water and a strong affinity for oil-type solvents.

The carboxyl group, for example, is representative of a polar group. The hydrocarbon chains, ether chains and other arrangements which may include carbonyl groups may be classified as non-polar groups.

With regard to the carboxyl compounds which have the inter-molecular balance between polar and non-polar portions of the compound which make them effective in imparting water-resistance to a polyvinyl acetate emulsion, we have found that certain of the organic acids which contain 3 to 8 carbon atoms are active. The molecular arrangement of the acids thus constituted appears to be unimportant as either mono-basic, di-basic or tri-basic acids within the prescribed limits are effective in producing water-resistance. Further, the active compound may contain other groups which are hydrophilic in nature as the hydroxyl and carbonyl groups. For example, levulinic acid has been found to be effective.

As polyvinyl acetate is an ester it is subject to hydrolysis in the presence of strong acids. The hydrolysis causes a slow decomposition of the ester and causes an emulsion of the ester to thicken progressively until it is rendered useless. We have found that this difficulty can be avoided in the practice of the instant invention by employing only the acids of the type specified which have an ionization constant which is less than about $6.6 \times 10^{-5}$ at 25° C., which is the ionization constant of succinic acid which is effective in producing water-resistance.

Active acids of this type, which include fatty acids having from 3 to 8 carbon atoms, are not sufficiently ionized to hydrolyze the vinyl acetate ester, and consequently the emulsions with which these active compounds are incorporated are stable over a long period of time. It was found that an emulsion treated with oxalic acid, which has an ionization constant of $6.5 \times 10^{-2}$ at 25° C., hydrolyzed after about 30 days. An emulsion treated with citric acid, which has an ionization constant of $8.4 \times 10^{-4}$ at 25° C., decomposed and thickened after a period of 6 to 10 weeks. In contrast to the above results, an emulsion treated with the fatty acids having ionization constants less than that of succinic acid showed good stability at the end of 3 months. For example, propionic acid, butyric acid and levulinic acid are effective insolubilizers of the films and bonds deposited from polyvinyl acetate emulsions. The insolubilizing action of these acids is effected by the non-ionized portion of the acids added to the emulsions. The ionized portions of the compounds may act to some extent to insolubilize the films and bonds, but in the manner of the acid ions of the strong organic acids and with the same undesirable results. For this reason, the prescribed ionization constant limitation must be observed in order to obtain satisfactory results.

Some of the active compounds within the prescribed class have a low solubility in water and effective quantities will not be solubilized by the external water phase of the emulsion. In the instances where the compounds are normally liquid this makes no material difference as such compounds are taken up or combined in a manner which makes them effective in producing water-resistance in the films deposited from the emulsion. Where the active compounds are normally solids they can be dissolved to obtain an effective concentration, and the solution thus formed mixed with the emulsion. For example, it is expedient to solubilize succinic and levulinic acid in either water or alcohol, and add the acid solution to the starting material emulsion.

The preferred range of quantities of one or more of the active compounds by weight with respect to the solid content of the polyvinyl acetate emulsion has been found to be between about 4–25%.

The physical properties of a polyvinyl acetate emulsion such as the viscosity of the emulsion, and the tensile strength, flexibility and heat sealing temperature of the film or bond deposited from the emulsion are determined in a large part by the degree of polymerization of the vinyl acetate monomer. A higher degree of polymerization results in increased bond strength, a higher heat sealing temperature and a somewhat higher initial water-resistance, which is, however, considerably less than required commercially for a water-resistant coating or bond. A lesser quantity of the active compounds is necessary to impart the desired water-resistance to the deposited coatings or bonds when the relatively greater water-resistant emulsions are employed as a starting material. The age of the starting material emulsion also determines in part the susceptibility of the emulsion to waterproofing, the older emulsions, for example, emulsions 4 to 6 months old, show better water-resistance when treated than those freshly made.

For present purposes the polyvinyl acetate starting material emulsions having sufficient tack to be useful as quick-setting adhesives and suitable for improvement according to the instant invention may be classified according to their initial water-resistance although in each instance the water-resistance is negligible from the standpoint of minimum commercial requirements. Such emulsions generally contain about 50–60% polyvinyl acetate by weight and a dried bond produced by the respective emulsions between two sheets of mildly calendered white sulphite paper will open up within 24 hours after immersion in water at about 25° C. Such polyvinyl acetate emulsions include the commercially available emulsions known as Elvacet No. 80–900, Elvacet 81–900, Gelva S–50 and Polyco 117H, Polyco 117SS and Polyco 289. Within 3 hours after immersion the bond shows less resistance than the wet strength of the paper, and upon separation of the bonded papers the bond disintegrates.

The physical characteristics of the commercially available polyvinyl acetate emulsions identified above may also vary to some extent as a result of the emulsifiers and bodying agents employed in producing the emulsions, and also as a result of particular plasticizers employed. In general, however, the variations which tend to increase the relative initial water-resistance of the starting material emulsions lessen the quantity of the active compounds required to effect complete water-resistance.

The amounts of active compound required to produce maximum water-resistance in a particular emulsion also varies with the quantity and the nature of the plasticizers, extenders, or other diluents which may be used to develop desired characteristics of fluidity or tackiness in the emulsion, or of flexibility, hardness, etc. in the coating or film deposited from the emulsion. In general, it has been found that the insoluble type of plasticizers and resins in common use increase the effectiveness of the active compounds, and that a lesser quantity of active compound is necessary to produce complete water-resistance when such plasticizers are also present in the emulsion. It should be noted, however, that in each instance the emulsion containing the plasticizers and various other diluents was not initially water-resistant and that the addition of the active compound is necessary to effect any satisfactory water-resistance, although as related above, a lesser amount is necessary when insoluble plasticizers are also present.

This enhancing effect of the insoluble plasticizers was particularly observed with respect to dimethyl phthalate, dibutyl phthalate, chlorinated diphenyls, methyl abietate and tributyl phosphate, and appears to be characteristic of other common plasticizers such as di-carbitol phthalate, dibutoxy-glycol phthalate, dimethoxy-glycol phthalate, butyl phthalyl butyl glycolate, methyl phthalyl ethyl glycolate, triglycol di-2-ethylbutyrate, triglycol di-2-ethylhexoate, tricresyl phosphate and triphenyl phosphate.

On the other hand, the presence of a small amount of certain water-soluble thickeners such as polyvinyl alcohol and sodium carboxymethyl cellulose tend to increase the amount of active compound necessary to effect maximum water-resistance.

In some instances care must be exercised to avoid breaking the emulsion by sudden heating, or by extended heating above the temperature specified. The critical temperature will vary, of course, with the character of the particular starting material emulsion employed.

Aging the composition tends to increase the water-resistance of the coatings or films deposited therefrom.

It will be apparent from the foregoing that innumerable possibilities for formulating the instant water-resistance composition exist, and that the invention may be practiced to increase the water-resistance of any particular polyvinyl acetate emulsion without materially interfering with the versatility of the starting material emulsion. It will be noted, however, that any of the active compounds having the requisite polar-non-polar balances in the molecules thereof and the stated ionization constant values are effective in producing water-resistance when used in quantities within the range of 4–25% by weight of the solids present in the starting material polyvinyl acetate emulsion. The minimum amount of a particular one of the active compounds depends upon the factors discussed above, but in all instances is within the range specified.

Compositions having up to 50% by weight of active compound with respect to the solid content of the polyvinyl acetate starting material emulsions may be employed, especially where the active compound has desirable plasticizing properties and the cost thereof is not prohibitive. In most instances, however, the maximum water-resistance is obtained with the least effect on other physical characteristics of the composition when a total of from 12–17% of active compound or compounds by weight of solids in the starting material emulsion are employed. In the event plasticizers are also used in formulating the composition the same effect can be achieved with slightly lesser quantities of the active compounds. Some of the numerous possibilities which exist in formulating a water-resistant composition within the operable limitations specified above are illustrated in the following examples.

The addition of the active compound to the starting material emulsion may result in a substantial increase in the viscosity of the emulsion to form a cohesive mass unless the active compound is added slowly with continuous agitation. In some instances rapid addition of the active compound results in localized precipitation of the emulsion. The largest part of the increased cohesiveness and viscosity of the emulsion caused by addition of the active compound at a suitable rate disappears on agitation, or when the treated emulsion is permitted to stand for a short period following the addition of the active compound.

In all of the following examples the composition was prepared by stirring the starting material emulsion with a high speed mixer continuously during the addition of the active compound thereto. The active compound was introduced into the emulsion at the rate of about 3% of the total weight of the active compound per minute.

Each of the tacky starting material polyvinyl emulsions was applied as a coating on the surface of a moderately calendered and sized white sulphite paper and as a bond between two such papers. The films and bonds thus formed were allowed to dry for 24 hours at room temperature and were thereafter immersed in water at room temperature for 24 hours. Upon removal from the water the wet strength of the paper exceeded the bond strength in all cases, and the bond ruptured when the bonded papers were separated. The coatings in each instance had visibly disintegrated. These starting material emulsions were, therefore, considered non-water-resistant, and in the subsequent experiments, satisfactory water-resistance of a film or bond formed from an emulsion treated with an active compound was considered fully indicated when the strength of the bond exceeded the wet strength of the paper after 24 hours immersion. It will be understood that the composition of the films and bonds deposited from the type of emulsion dealt with here is the same as that of the emulsion except for the external water phase which evaporates upon drying.

Example 1

7 grams of succinic acid were dissolved in about 25 cc. of water and this solution was added slowly to 110 grams of a polyvinyl acetate emulsion having about 55% solid content. The emulsion was stirred continuously during the addition of the acid. A second sample was prepared in a similar manner using 15 grams of succinic acid. In this instance a small amount of the succinic acid crystallized out as it was present in amounts in excess of its solubility limit. A portion of each sample was applied to a moderately sized and calendered white sulphite paper as both films and bonds. These were allowed to dry for 24 hours and were then immersed in water at room temperature for about 24 hours. At the end of this period the film and bonds were still intact and the strength of the bonds exceeded the wet strength of the paper, i. e., when the bonded papers were separated the bond remained intact and portions of the papers adhered to the bond.

A third sample was similarly prepared using 4 grams of succinic acid. To this 10 grams of a dimethyl phthalate plasticizer were added. The resulting mixture was stirred until it became homogeneous. The composition was then applied as a film and bond in the manner described above. Both the films and bonds deposited from this composition were waterproof.

Example 2

12 grams of levulinic acid were dissolved in about 30 cc. of water. This solution was added to 220 grams of a tacky polyvinyl acetate emulsion having a solid content of about 55%. The addition was made slowly while the vinyl acetate was being stirred with a high speed mixer. A second sample was similarly prepared using 25 grams of levulinic acid and enough additional water to take the acid into solution. A third sample was prepared by adding to a portion of the first sample 5 grams of a chlorinated diphenyl plasticizer and 5 grams of methyl abietate plasticizer. The films and bonds deposited from these samples were tested for waterproofness in the manner described in Example 1. All were found to be waterproof.

Example 3

11 grams of propionic acid were added to 110 grams of a tacky polyvinyl acetate resin having about 55% solid content. The acid was added slowly and the vinyl acetate emulsion constantly agitated during the addition. A second sample was prepared in a similar manner and to this 5 grams of dimethyl phthalate plasticizer were added. The films and bonds deposited from both these samples were found to be waterproof when tested in the manner described in Example 1.

Example 4

Three samples were prepared by adding to a tacky polyvinyl acetate emulsion (110 grams to each sample) having a solid content of about 55%, 5, 10 and 20 grams, respectively, of butyric acid. The addition of the acid was made slowly while the acetate emulsion was being stirred continuously. A fourth sample was prepared by adding 3 grams of butyric acid and 5 grams of dibutyl phthalate plasticizer to 110 grams of a polyvinyl acetate emulsion. The films and bonds deposited from all four compositions were tested for waterproofness in the manner described in Example 1 and all were found to be waterproof.

Example 5

5.5 grams of caprylic acid was mixed with 110 grams of a tacky polyvinyl acetate emulsion while the emulsion was being continually stirred. A second sample was prepared by mixing 10 grams of caprylic acid with 110 grams of the same starting material emulsion. A third sample was prepared by the addition of 3 grams of caprylic acid, and 10 grams of dibutyl phthalate to 110 grams of the same starting material emulsion. The additions were made slowly as the emulsion was constantly stirred. The films and bonds deposited from these compositions were tested for waterproofness in the manner described in Example 1 and all were found to be waterproof.

It will be apparent that the water-resistant compositions formulated according to the instant invention will considerably extend the usefulness of aqueous emulsions of polyvinyl acetate into the field in which high water-resistance of the bond or coating deposited is necessary, and will find application in bonding or cementing for cellulosic articles such as paper cups or paper bags which in the course of normal use are exposed to water, and for bonding surfaces of cellulosic material to other surfaces of a hydrophilic character such as masonry. These instant compositions are particularly adapted for use as a sizing where water-resistance of the fabric or the paper to which it is applied is required. It may also be employed in the composition of printing paste, as a finish for paper, paper-board, or foils and in the manufacture of formed or impregnated goods, as well as in distemper paints and the like.

Having thus described the invention, what is new and desired to be secured by Letters Patent is:

1. A composition comprising a tacky aqueous emulsion of polyvinyl acetate and from 4 to 50% by weight of said acetate of an aliphatic saturated organic acid having an ionization constant of less than about $6.6 \times 10^{-5}$ and 3 to 8 carbon atoms.

2. A composition comprising a tacky aqueous emulsion of polyvinyl acetate and from 4 to 50% by weight of said acetate of a saturated aliphatic monobasic organic acid having an ionization constant of less than about $6.6 \times 10^{-5}$ and 3 to 8 carbon atoms.

3. A composition comprising an aqueous emulsion of polyvinyl acetate and from 4 to 50% by weight of said acetate of a polybasic organic acid having an ionization constant of less than about $6.6 \times 10^{-5}$.

4. A composition comprising tacky aqueous emulsion of polyvinyl acetate and from 4 to 50% by weight of said acetate of succinic acid.

5. A composition comprising tacky aqueous emulsion of polyvinyl acetate and from 4 to 50% by weight of said acetate of butyric acid.

6. A composition comprising tacky aqueous emulsion of polyvinyl acetate, a plasticizer for said acetate and from 4 to 25% by weight of said acetate of an aliphatic saturated organic acid having an ionization constant of less than about $6.6 \times 10^{-5}$ and 3 to 8 carbon atoms.

7. A composition comprising a tacky aqueous emulsion of polyvinyl acetate, a plasticizer for said acetate and from 4 to 25% by weight of said acetate of a saturated aliphatic monobasic organic acid having an ionization constant of less than about $6.6 \times 10^{-5}$ and 3 to 8 carbon atoms.

8. A composition comprising a tacky aqueous emulsion of polyvinyl acetate, a plasticizer for said acetate and from 4 to 25% by weight of said acetate of a saturated aliphatic polybasic organic acid having an ionization constant of less than about $6.6 \times 10^{-5}$ and 3 to 8 carbon atoms.

9. A base having a water resistant coating deposited thereon from a composition comprising an aqueous emulsion of polyvinyl acetate and from 4-50% by weight of said acetate of an aliphatic saturated organic acid having an ionization constant of less than about $6.6 \times 10^{-5}$ and 3 to 8 carbon atoms.

WALTER G. KUNZE.
RAYMOND BERTRAM EVANS.

REFERENCES CITED

The following references are of record in the file of this patent:

UNITED STATES PATENTS

| Number | Name | Date |
| --- | --- | --- |
| 2,444,396 | Collins et al. | June 29, 1948 |